United States Patent
Martin et al.

(10) Patent No.: US 7,581,503 B2
(45) Date of Patent: Sep. 1, 2009

(54) FERTILIZER OPENER/CLOSER ARRANGEMENT FOR AN AGRICULTURAL MACHINE

(75) Inventors: Robert W. Martin, ParkView, IA (US); James R. Peterson, Jr., Annawan, IL (US)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 11/849,657

(22) Filed: Sep. 4, 2007

(65) Prior Publication Data

US 2009/0056962 A1    Mar. 5, 2009

(51) Int. Cl.
 A01B 21/02 (2006.01)
 A01B 59/00 (2006.01)
 A01C 5/00 (2006.01)
 A01C 13/00 (2006.01)

(52) U.S. Cl. ........................ 111/167; 111/193; 111/195; 172/555; 172/540; 172/604

(58) Field of Classification Search ......... 111/120–122, 111/149, 157–169, 190–196; 172/518, 540–576, 172/579–604
See application file for complete search history.

(56) References Cited

U.S. PATENT DOCUMENTS

| | | | |
|---|---|---|---|
| 4,141,302 A * | 2/1979 | Morrison et al. | 111/52 |
| 4,196,679 A * | 4/1980 | Moore | 111/194 |
| 4,760,806 A | 8/1988 | Bigbee et al. | 111/87 |
| 4,831,945 A | 5/1989 | Neumeyer | 111/73 |
| 5,419,402 A * | 5/1995 | Heintzman | 172/551 |
| 5,609,114 A | 3/1997 | Barton | 111/167 |
| 5,887,664 A | 3/1999 | Whalen et al. | 172/430 |
| 6,032,593 A | 3/2000 | Wendling et al. | 111/187 |
| 6,067,918 A | 5/2000 | Kirby | 111/121 |
| 6,209,466 B1 | 4/2001 | Wodrich | 111/189 |
| 6,216,616 B1 | 4/2001 | Bourgault | 111/186 |
| 6,314,897 B1 | 11/2001 | Hagny | |
| 6,347,594 B1 | 2/2002 | Wendling et al. | |
| 6,701,856 B1 | 3/2004 | Zoske et al. | 111/121 |
| 6,978,727 B2 | 12/2005 | Geddes | 111/167 |

\* cited by examiner

Primary Examiner—Christopher J. Novosad
(74) Attorney, Agent, or Firm—Taylor & Aust, P.C.

(57) ABSTRACT

An agricultural machine includes a tool bar and at least one opener/closer arrangement carried by the tool bar for opening a trench in soil. Each opener/closer arrangement includes an opener disc positioned at an angle relative to a working direction and defining a trench profile. The opener disc has an axis of rotation, a leading edge, and a trailing edge positioned adjacent one side of the trench profile. A gauge wheel is positioned generally inline with the opener disc adjacent to the trailing edge of the opener disc. The gauge wheel has a leading edge positioned between the leading edge and the trailing edge of the opener disc. A first closing wheel is positioned on a side of the trench profile opposite to the gauge wheel. The first closing wheel has a leading edge positioned between the axis of rotation and the trailing edge of the opener disc. A second closing wheel is positioned on a same side of the trench profile as the gauge wheel.

18 Claims, 4 Drawing Sheets

# fFERTILIZER OPENER/CLOSER ARRANGEMENT FOR AN AGRICULTURAL MACHINE

FIELD OF THE INVENTION

The present invention relates to agricultural machines, and, more particularly, to fertilizer openers for forming a trench in soil in which fertilizer is deposited.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar.

In areas where air seeder type equipment is used to seed small grains there has been a significant move to reduce input costs to the seeding process. One way to do this is to adopt no-till farming practices to reduce equipment and fuel costs. Another way is to combine the operations involved in seeding, for example tillage, seed bed preparation, fertilizer and seed placement. A further option is to utilize combined operations in a no-till farming practice.

There are machines presently available that have some ability to combine these operations. These are usually divided into two categories, air hoe drills and air disc drills. The first utilizes a combination of shanks with shovels or boots to create a trench for the seed, basically it 'hoes' a trench. Examples of such tools are John Deere 1820, Bourgault 5710, Morris Maxim II, 8900 and 9000, or Case ATX Series. The second type utilizes disc type openers to create the seed trench. Examples of such tools are John Deere 1890, Bourgault 5720, Morris Never Pin or Case SDX Series.

Not all of these machines are capable of placing fertilizer at the same time as seeding. Generally it is easiest to place dry granular fertilizer at the same time as seeding since that type of fertilizer can be distributed by a similar air delivery system. The application of liquid fertilizer requires an additional delivery and distribution system, typically not supplied by the air seeder manufacturer. The application of gaseous fertilizer such as anhydrous ammonia (also referred to as NH3) also requires an additional delivery and distribution system, typically not supplied by the air seeder manufacturer. A further difficulty with NH3 is the requirement to effectively seal the gas into the ground. This is typically the most challenging task for these openers.

To effectively retain the gas in the ground it is necessary to place the gas accurately in a trench and seal it therein. To achieve this it is preferable to create a small, neat trench at constant depth and close the trench quickly and efficiently afterwards. The difficulties encountered with known designs are in all aspects of this operation. Those devices suffer from one or more of the following detrimental actions: 1) too much soil disturbance creating a large trench with soil displaced significantly; 2) lack of depth control; 3) inability to close or seal the trench immediately after release of the gas; and 4) high draft because of the need to place the NH3 at deeper depths.

The most popular method of applying NH3 in the midwestern portion of the U.S.A. is through the use of a shank type opener with two closing disks positioned behind the shank relative to a working direction. NH3 is typically applied in the fall of the year with a shank type opener, resulting in an additional field operation with associated costs. Although these type of openers function well, they require deep (6-10") application in order to obtain adequate NH3 retention. Application at these depths requires a lot of horsepower and results in a field with noticeable soil disturbance.

In areas where air seeding equipment is used, many farmers are changing from conventional farming to direct or one-pass seeding (placing fertilizer during seeding). These type of air seeders generally use disc openers to apply NH3 because the rate of application is significantly smaller at the time of seeding vs. a fall application. This lower rate allows the use of disc openers that have much less soil disturbance than a traditional shank. One difficulty with these type of openers is the ability to adequately seal the trench and prevent outgassing due to the shallow depth and formation of a trench. Developing a single disk opener that can adequately apply and retain high rates of NH3 at high speeds and shallow depths would provide farmers and custom applicators with a more productive NH3 applicator than the traditional shank applicator.

What is needed in the art is an opener/closer arrangement which does not open the trench too deep, effectively seals the fertilizer within the trench, effectively closes the trench, and has a low draft at high operating speeds.

SUMMARY OF THE INVENTION

The invention in one form is directed to an agricultural machine, including a tool bar and at least one opener/closer arrangement carried by the tool bar for opening a trench in soil. Each opener/closer arrangement includes an opener disc positioned at an angle relative to a working direction and defining a trench profile. The opener disc has an axis of rotation, a leading edge, and a trailing edge positioned adjacent one side of the trench profile. A gauge wheel is positioned generally inline with the opener disc adjacent to the trailing edge of the opener disc. The gauge wheel has a leading edge positioned between the leading edge and the trailing edge of the opener disc. A first closing wheel is positioned on a side of the trench profile opposite to the gauge wheel. The first closing wheel has a leading edge positioned between the axis of rotation and the trailing edge of the opener disc. A second closing wheel is positioned on a same side of the trench profile as the gauge wheel.

DETAILED DESCRIPTION OF THE INVENTION

Figure 1:
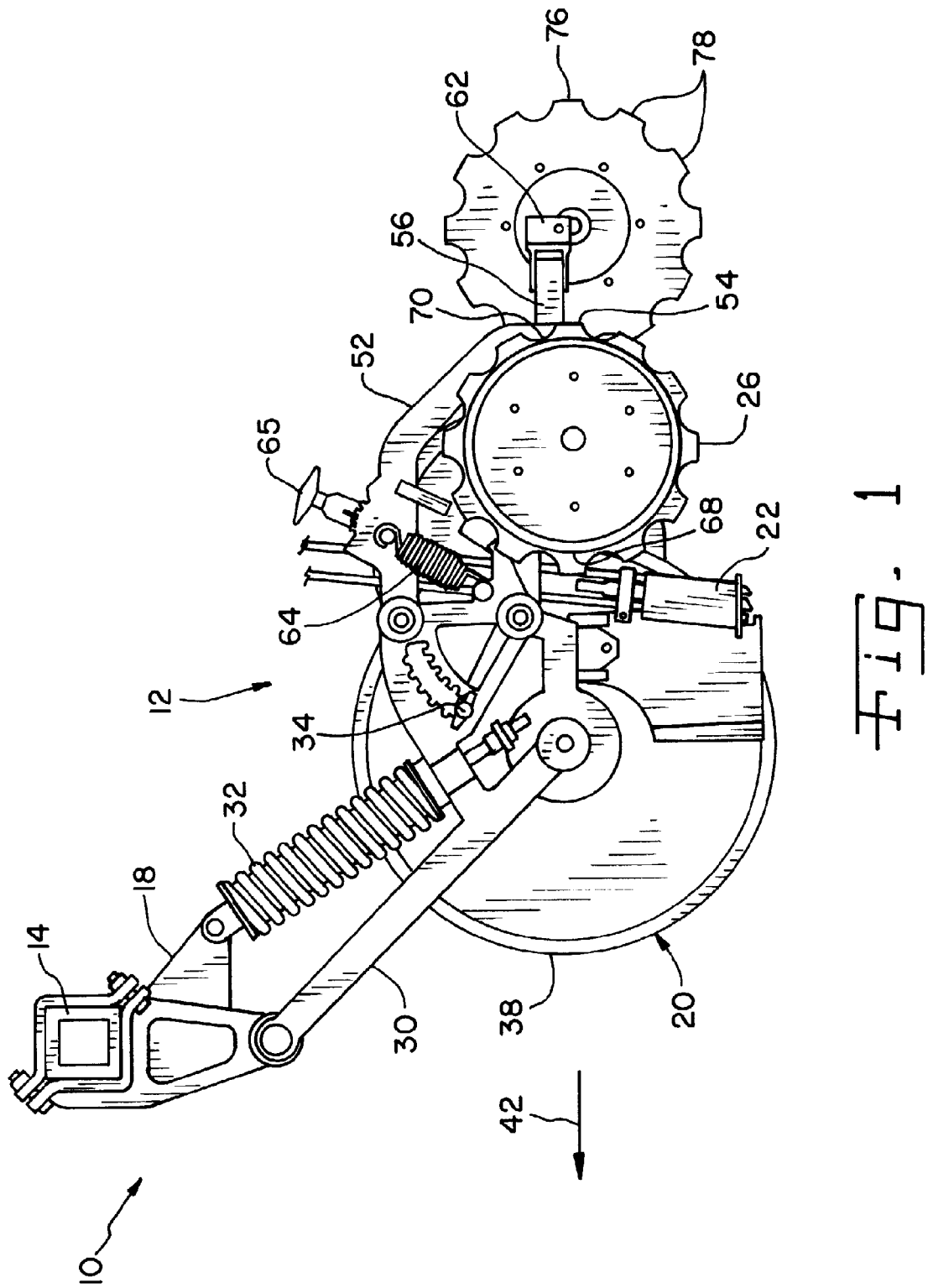
FIG. 1 is a side view of a portion of an agricultural machine including an embodiment of a fertilizer opener/closer arrangement of the present invention.
Figure 2:
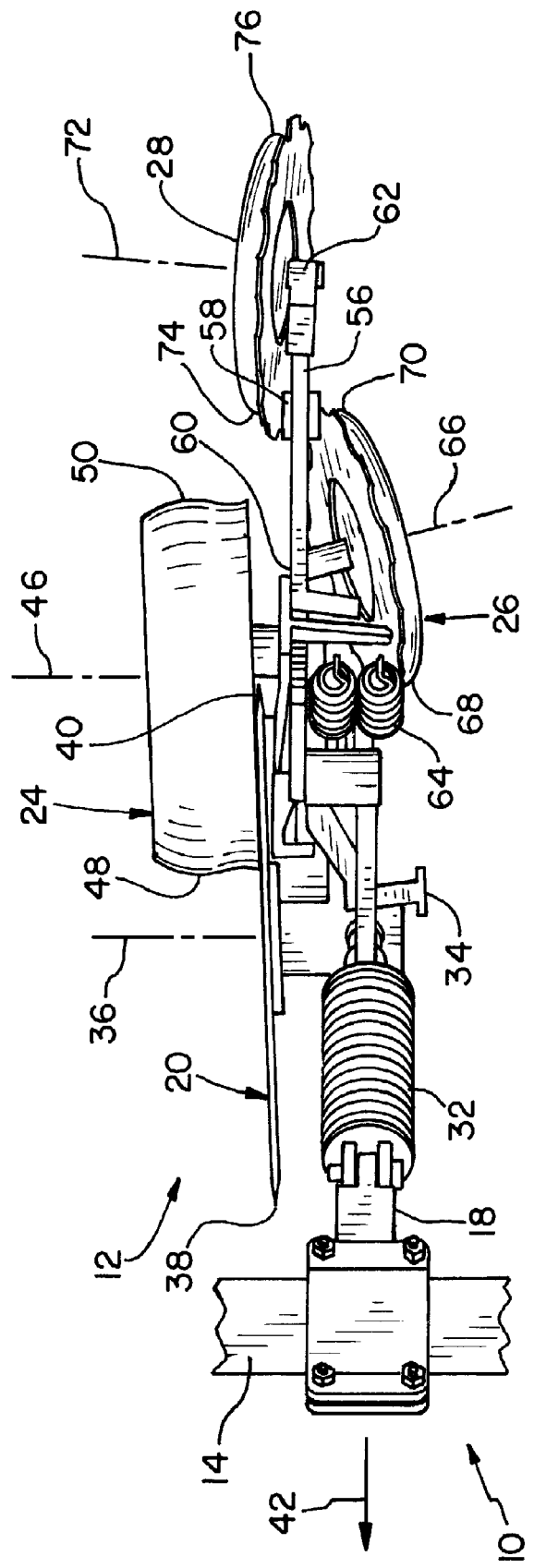
FIG. 2 is a top view of the fertilizer opener/closer arrangement of FIG. 1.
Figure 3:
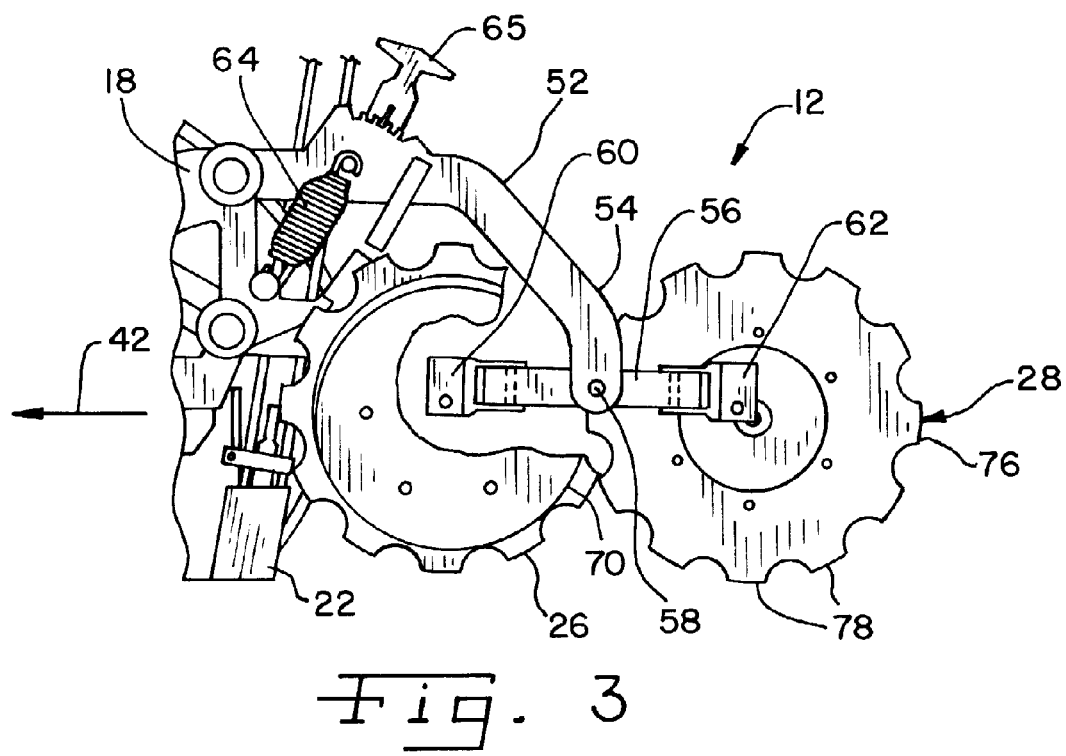
FIG. 3 is a fragmentary, side, sectional view of the fertilizer opener/closer arrangement of FIGS. 1 and 2.

Referring now to the drawings, and more particularly to FIGS. 1-3, there is shown an embodiment of an agricultural machine of the present invention in the form of a fertilizer applicator 10. Agricultural machine 10 may also be differently configured, such as an air seeder with an integral fertilizer applicator.

Fertilizer applicator 10 generally includes a plurality of fertilizer opener/closer arrangements 12, with each fertilizer opener/closer arrangement 12 being substantially identical (although left hand and right hand opener/closer arrangements may be provided, as required for the specific application). Only a single fertilizer opener/closer arrangement 12 is shown in FIGS. 1-3 for simplicity sake. Each fertilizer opener/closer arrangement 12 is connected to a common tool bar 14, which in turn is coupled to a traction unit (not shown), such as an agricultural tractor. Tool bar 14 may be coupled with transport wheel assemblies, etc. which may be of conventional design and not shown for simplicity sake.

Fertilizer opener/closer arrangement 12 opens a trench in the soil in which one or more selected fertilizer types are deposited (e.g., dry, liquid and/or gaseous NH3 fertilizer). Fertilizer opener/closer arrangement 12 generally includes a frame 18 carrying an opener disc 20, boot/scraper 22, gauge wheel 24, first closing wheel 26 and second closing wheel 28. Frame 18 includes a frame member 30 which is biased in a downward direction with a compression coil spring 32. A quick-adjust depth adjuster 34 moves the vertical orientation of gauge wheel 24 relative to opener disc 20 to thereby adjust the cutting depth of opener disc 20 into the soil.

Opener disc 20 opens a trench in the soil and defines a trench profile of the trench opened in the soil. That is, the projected frontal area of the portion of opener disc 20 below the surface of the soil defines the trench profile. Opener disc 20 rotates about an axis of rotation 36, and includes a leading edge 38 and trailing edge 40, relative to a working direction 42. Opener disc 20 is preferably generally planar, but may also have a generally convex or concave shape relative to the working direction 42, depending upon the application. Opener disc 20 is oriented at a selected angle relative to working direction 42 (e.g., 4 degrees).

Boot/scraper 22 is positioned behind opener disc 20 relative to working direction 42. Boot/scraper 22 may lie within the trench profile so as not to widen the trench formed in the soil by opener disc 20, or may be positioned slightly offset to slightly widen the trench (e.g., ¼ inch), depending upon the application. Boot/scraper 22 has a contour closely matching with the trench side of opener disc 20 to effectively scrape mud, soil and other debris from the trench side of opener disc 20.

An NH3 fertilizer tube 44 is attached to boot/scraper 22. An optional liquid fertilizer tube 45 may be provided for some applications, the primary difference being the diameter of the tube. A vent tube 47 is positioned between NH3 tube 44 and liquid fertilizer tube 45. From the foregoing, it should be apparent that the number and/or type of fertilizer tubes attached to boot/scraper 22 can vary. Additionally, NH3 tube 44 may be carried by another selected component of fertilizer opener/closer 10, such as frame member 30 or 52.

Figure 4:
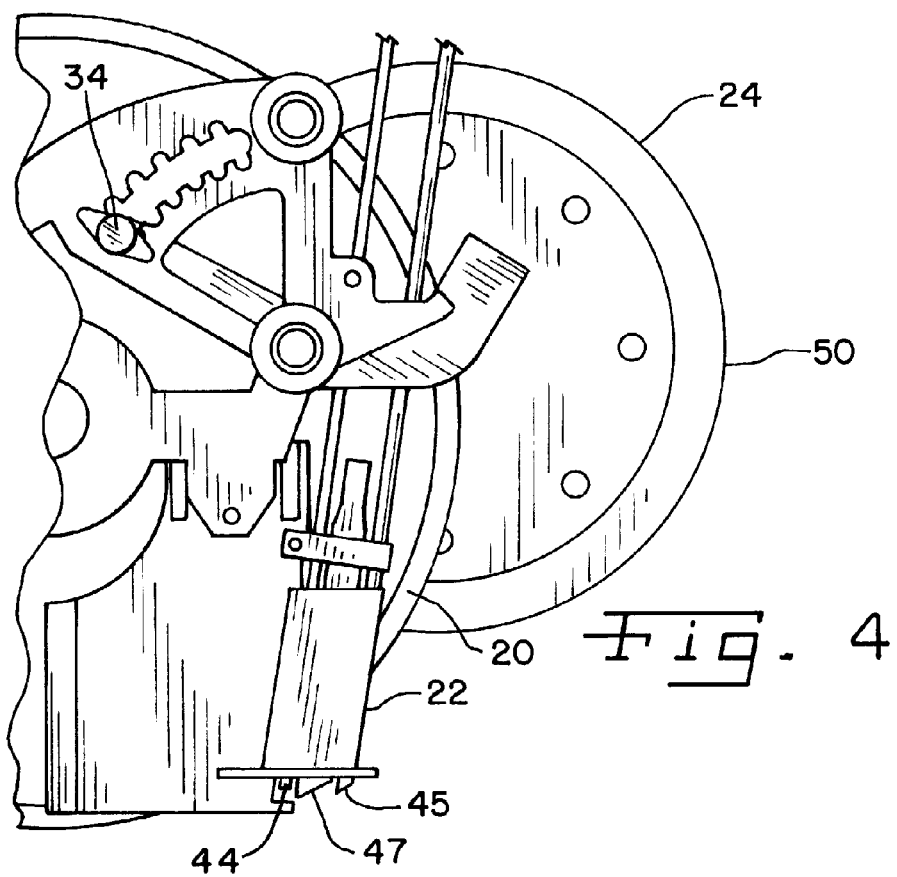
FIGS. 4 and 5 are side views of a portion of the fertilizer opener/closer arrangement of FIGS. 1-3, illustrating the gauge wheel in raised and lowered positions.
Figure 5:
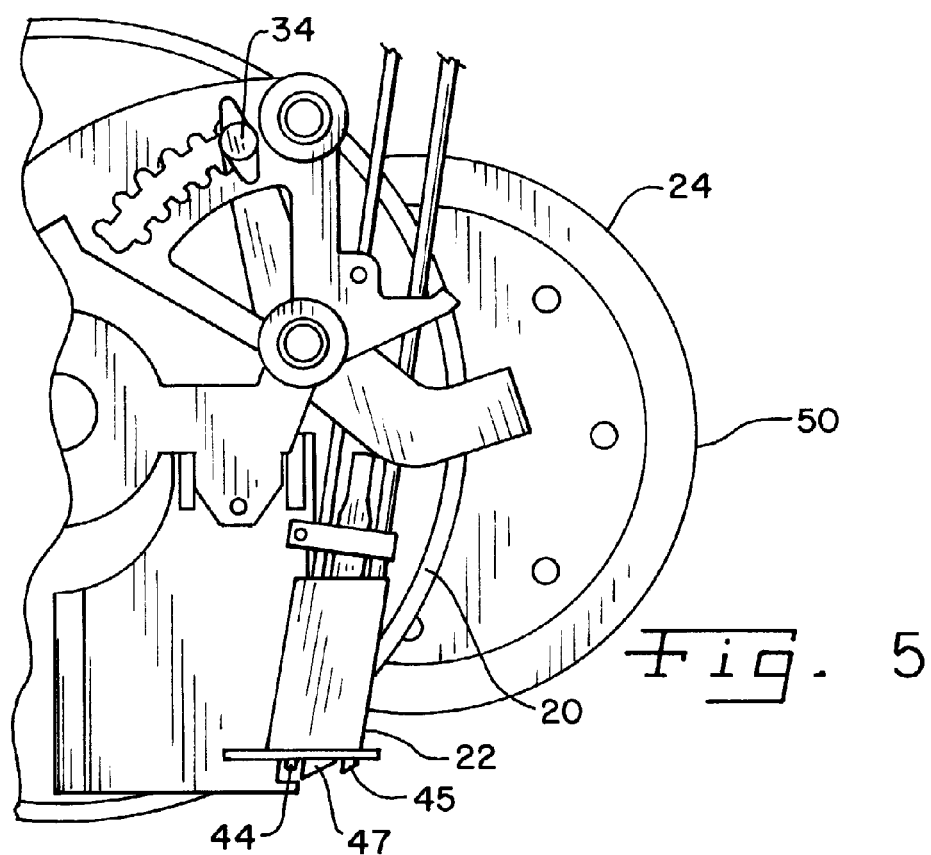
Figure 6:
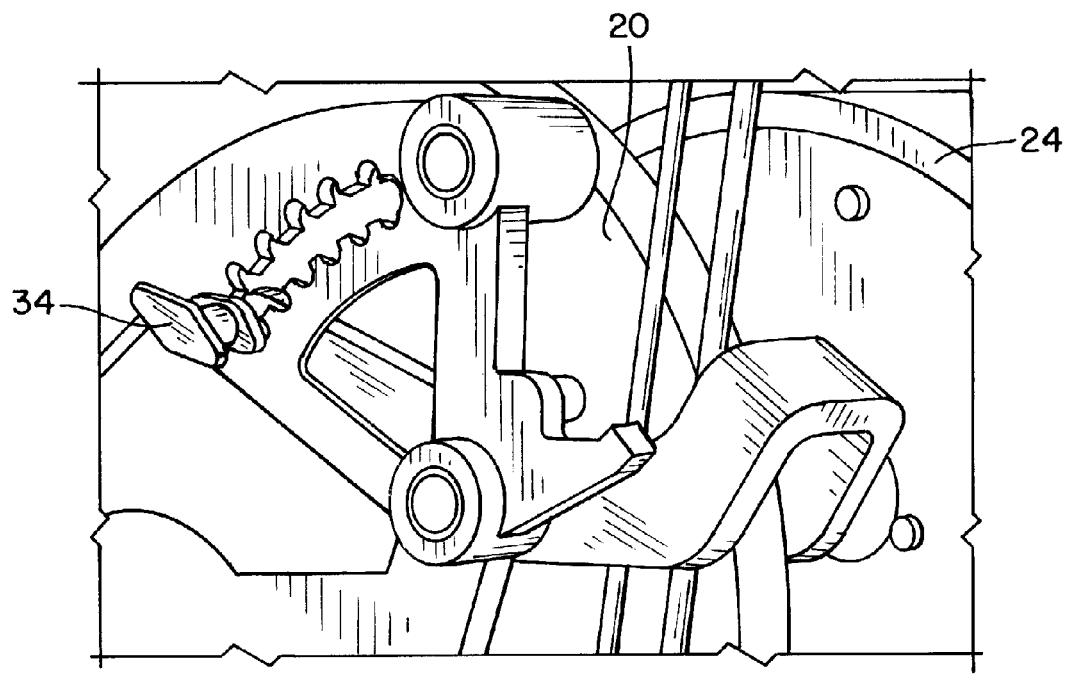
FIG. 6 is a rear, perspective view illustrating the adjustment arm for the gauge wheel.

Gauge wheel 24 is positioned generally inline with opener disc 20 adjacent to the trailing edge 40 of opener disc 20 (that is, on the off-trench side of opener disc 20). Gauge wheel 24 has an axis of rotation 46, and includes a leading edge 48 and trailing edge 50, relative to working direction 42. Leading edge 48 of gauge wheel 24 is positioned between axis of rotation 36 and trailing edge 40 of opener disc 20. Quick-adjust depth adjuster 34 is pivotally coupled with frame 18 and includes an outboard end which carries gauge wheel 24. Locking depth adjuster 34 at a desired pivotal location in turn sets the vertical position of gauge wheel 24 relative to opener disc 20, thereby adjusting the cutting depth of opener disc 20 into the soil. Gauge wheel 24 is shown in a vertically upward position in FIG. 4 and in a vertically downward position in FIG. 5.

A frame member 52 carries each of first closing wheel 26 and second closing wheel 28. Frame member 52 includes an end 54 which is movable in upward and downward directions. A walking beam 56 is pivotably mounted to end 54 of frame member 52 at a pivot point 58 defined by a pivot pin. Walking beam 56 has opposite ends 60 and 62, with first closing wheel 26 mounted at end 60 and second closing wheel 28 mounted at end 62. Walking beam 56 is biased in a downward direction using a pair of tension springs 64, although a different type or number of springs can also be used. A tension adjuster 65 is used to set the down pressure on closing wheels 26 and 28.

First closing wheel 26 is positioned on a side of the trench profile opposite from gauge wheel 24. First closing wheel 26 has an axis of rotation 66, and includes a leading edge 68 and trailing edge 70, relative to a working direction 42. Leading edge 68 is positioned between axis of rotation 36 and trailing edge 40 of opener disc 20. Leading edge 68 is also positioned between axis of rotation 46 and leading edge 48 of gauge wheel 24.

Second closing wheel 28 is positioned on a same side of the trench profile as gauge wheel 24. Second closing wheel 28 has an axis of rotation 72, and includes a leading edge 74 and trailing edge 76. In the embodiment shown, leading edge 74 of second closing wheel 28 is positioned generally inline with trailing edge 70 of first closing wheel 26, relative to working direction 42.

In the embodiment shown, first closing wheel 26 and second closing wheel 28 each include optional radially outwardly extending projections 78 which assist in perforating the soil adjacent to the trench and closing the trench. Projections 78 are defined by a metal plate which is affixed at the trench side of each first closing wheel 26 and second closing wheel 28. Other types of optional projections such as integral spikes, etc. at the radial periphery of first closing wheel 26 and second closing wheel 28 are also possible.

Fertilizer opener/closer arrangement 12 provides the following non-inclusive advantages:

1) a larger opener disc 20 for increased depth;
2) a repositioned gauge wheel 24 to prevent slabbing of the trench side wall;
3) a repositioned boot/scraper 22 to release NH3 behind opener disc 20 to prevent freezing of opener disc 20, or freezing of soil on opener disc 20 and/or boot/scraper 22;
4) a repositioned boot/scraper 22 closer to closing wheels 26 and 28 for quicker sealing and improved NH3 retention;
5) a new closing wheel system utilizing two staggered closing wheels 26 and 28.

a). First closing wheel 26 functions to provide a "quick" initial closing of the trench and is located on the scraper side of the opener disc 20.

b). Second closing wheel 28 not only finishes closing the trench but also reduces the amount of soil disturbance left by opener disc 20 and is located on the gauge wheel side of opener disc 20 where the compressed soil is located. Second closing wheel 28 brings the soil displaced by opener disc 20 back to the center of the trench resulting in improved NH3 retention and less ground disturbance.

c). The dual closing wheel system can include an independent or linked suspension and down pressure for each of closing wheels 26 and 28. The design path chosen in the illustrated embodiment attaches the closing wheels to a walking beam to ensure even force and constant contact with the ground. This option provides a lower cost alternative, less required space, is easier to adjust than the independent system, and keeps the closing wheels 26 and 28 in contact with the ground.

d). Fertilizer opener/closer arrangement 12 utilizes higher closing wheel down force and lighter weight wheels to reduce momentum in rough ground conditions. The down force can be accomplished using a spring, pneumatic, hydraulic and/or electric arrangement.

e). Optional wheel projections 78 break up the trench side wall in hard ground conditions to ensure good trench closure. Projections 78 can be positioned on the front or rear closing wheel 26 or 28, or on both wheels depending on the conditions.

6. improved NH3 retention at shallower placement depths due to the closing system, which in turn allows farmers and custom applicators to run the equipment at higher ground speed due to lower draft resulting in increased productivity.

During operation, the cutting depth of opener disc 20 is manually set using depth adjuster 34. The fertilizer applicator 10 is raised at the ends of the field for turning around, and lowered for traveling across the field. When the fertilizer applicator is lowered, coil spring 32 biases opener disc 20 into the soil. Opener disc 20 forms a trench in the soil having a width corresponding to the projected frontal width of opener disc 20 at an angle to working direction 42. The one or more fertilizer tubes 44 and 45 have a discharge end which is positioned behind boot/scraper 22 within the trench profile of opener disc 20. The fertilizer is deposited into the trench, which is then covered by first closing wheel 26 and second closing wheel 28.

Having described the preferred embodiment, it will become apparent that various modifications can be made without departing from the scope of the invention as defined in the accompanying claims.

The invention claimed is:

1. An agricultural machine, comprising:
   a tool bar; and
   at least one opener/closer arrangement carried by said tool bar for opening a trench in soil, each said opener/closer arrangement including:
      an opener disc positioned at an angle relative to a working direction and defining a trench profile, said opener disc having an axis of rotation, a leading edge, and a trailing edge positioned adjacent one side of said trench profile;
      a gauge wheel positioned generally inline with said opener disc adjacent said trailing edge of said opener disc, said gauge wheel having a leading edge positioned between said leading edge and said trailing edge of said opener disc;
      a first closing wheel positioned on a side of said trench profile opposite said gauge wheel, said first closing wheel having a leading edge positioned between said axis of rotation and said trailing edge of said opener disc; and
      a second closing wheel positioned on a same side of said trench profile as said gauge wheel, said first closing wheel having a trailing edge, said second closing wheel leading edge being positioned generally inline with said trailing edge of said first closing wheel, relative to the working direction.

2. The agricultural machine of claim 1, including a walking beam having opposite ends and a pivot point between said ends, said first closing wheel mounted at one of said ends and said second closing wheel mounted at an other of said ends.

3. The agricultural machine of claim 2, including a frame member having an end movable up and down, said walking beam pivotably mounted to said frame member end at said pivot point.

4. The agricultural machine of claim 3, wherein said walking beam is biased in a downward direction using at least one of a spring, pneumatic, hydraulic and electric arrangement.

5. The agricultural machine of claim 1, wherein at least one of said first closing wheel and said second closing wheel include radially outwardly extending projections.

6. The agricultural machine of claim 1, wherein said leading edge of said first closing wheel is positioned behind said leading edge of said gauge wheel, relative to the working direction.

7. The agricultural machine of claim 6, wherein said gauge wheel has an axis of rotation, said leading edge of said first closing wheel being positioned between said axis of rotation and said leading edge of said gauge wheel.

8. The agricultural machine of claim 1, including a boot/scraper positioned behind said opener disc relative to said working direction.

9. The agricultural machine of claim 1, wherein said gauge wheel has a leading edge positioned between said axis of rotation and said trailing edge of said opener disc.

10. An opener/closer arrangement for opening a trench in soil, comprising:
    an opener disc positioned at an angle relative to a working direction and defining a trench profile, said opener disc having an axis of rotation, a leading edge, and a trailing edge positioned adjacent one side of said trench profile;
    a gauge wheel positioned generally inline with said opener disc adjacent said trailing edge of said opener disc, said gauge wheel having a leading edge positioned between said leading edge and said trailing edge of said opener disc;
    a first closing wheel positioned on a side of said trench profile opposite said gauge wheel, said first closing wheel having a leading edge positioned between said axis of rotation and said trailing edge of said opener disc; and
    a second closing wheel positioned on a same side of said trench profile as said gauge wheel, said first closing wheel having a trailing edge, said second closing wheel having a leading edge positioned generally inline with said trailing edge of said first closing wheel, relative to the working direction.

11. The opener/closer arrangement of claim 10, including a walking beam having opposite ends and a pivot point between said ends, said first closing wheel mounted at one of said ends and said second closing wheel mounted at an other of said ends.

12. The opener/closer arrangement of claim 11, including a frame member having an end movable up and down, said walking beam pivotably mounted to said frame member end at said pivot point.

13. The opener/closer arrangement of claim 12, wherein said walking beam is biased in a downward direction using at least one of a spring, pneumatic, hydraulic and electric arrangement.

14. The opener/closer arrangement of claim 10, wherein at least one of said first closing wheel and said second closing wheel include radially outwardly extending projections.

15. The opener/closer arrangement of claim 10, wherein said leading edge of said first closing wheel is positioned behind said leading edge of said gauge wheel, relative to the working direction.

16. The opener/closer arrangement of claim 15, wherein said gauge wheel has an axis of rotation, said leading edge of said first closing wheel being positioned between said axis of rotation and said leading edge of said gauge wheel.

17. The opener/closer arrangement of claim 10, including a boot/scraper positioned behind said opener disc relative to said working direction.

18. The opener/closer arrangement of claim 10, wherein said gauge wheel has a leading edge positioned between said axis of rotation and said trailing edge of said opener disc.

* * * * *